Aug. 21, 1928.  
J. T. PEARSON ET AL  
1,681,594

COVER FOR CONDUIT OUTLET BOXES

Filed April 15, 1925

INVENTORS.  
John T. Pearson and Raymond H. Olley  
BY  
Parsons & Bodell  
ATTORNEYS.

Patented Aug. 21, 1928.

1,681,594

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

COVER FOR CONDUIT-OUTLET BOXES.

Application filed April 15, 1925. Serial No. 23,333.

This invention relates to covers for conduit outlet boxes of the type set forth in our Patent Number 1,525,689, issued Feb. 10, 1925, and has for its object a particularly simple, light and strong construction of a cover, and simple assembly of the wedging member or nut, of the self-contained fastening means for the cover.

The invention consists in the novel features and in the combinations and constructions hereinafter set forth and claimed.

In describing this invention reference is had to the accompanying drawings in which like characters designate corresponding parts in all the views.

Figure 1:
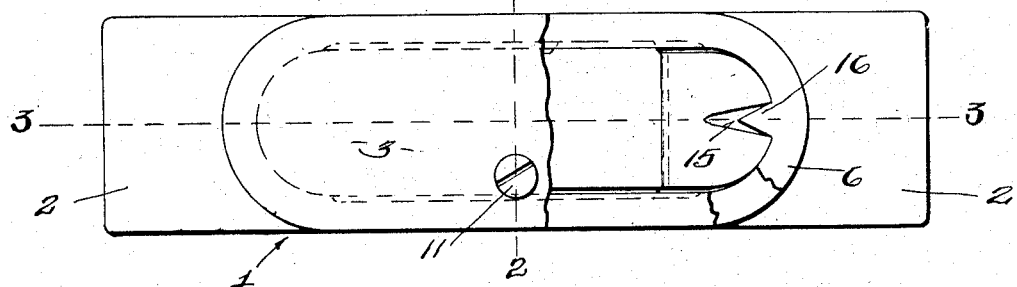
Figure 1 is a face view of a conduit outlet box, provided with this cover, the cover being partly broken away.
Figure 2:
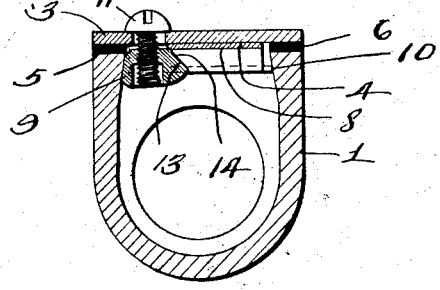
Figure 2 is a transverse sectional view on line 2—2, Fig. 1.
Figure 3:
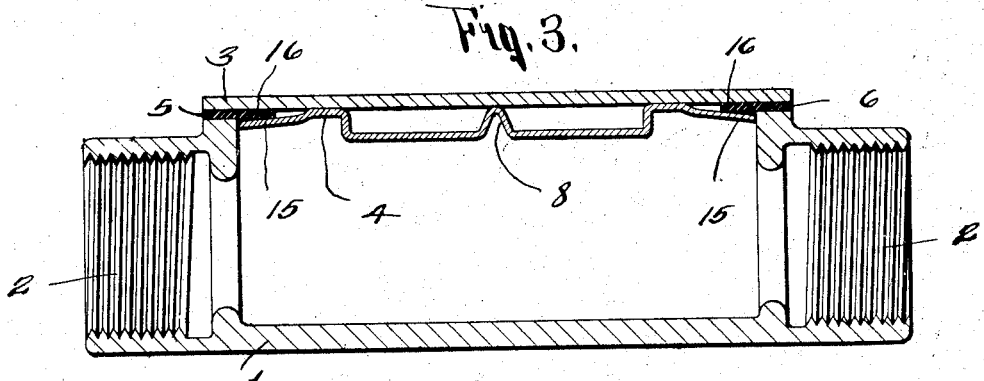
Figure 3 is a longitudinal sectional view on line 3—3, Fig. 1.
Figure 4:
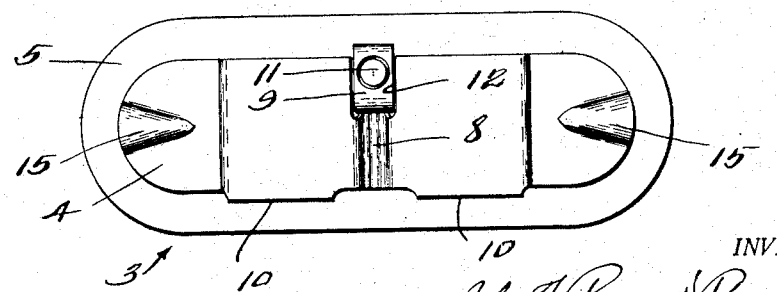
Figure 4 is an inner face view of the cover.

1 designates a conduit outlet box having an opening in one side, and means as one or more nipples 2 for connection in the conduit system enclosing the wires passing through openings in the cover, the walls confining the opening being flat or free from obstructions projecting into the body, as lugs for receiving fastening screws for the cover.

The conduit outlet boxes are usually elongated and the opening in one side thereof is elongated or oblong and narrow, and the cover conforms to the narrow opening in the box.

The cover includes a body 3, and a plate 4 secured to the inner face of the body 3, the outer edge of the plate 4 being spaced-apart from the edge of the body 3 leaving a marginal bearing face 5 around the plate for resting upon the edge of the wall around the opening of the box, or on a gasket 6 interposed between the marginal bearing face 5 and the edge of the wall around the opening in the box. The plate is secured at its ends to the inner face of the box in any suitable manner as by spot-welding and the intermediate part of the plate is offset or spaced-apart from the inner face of the box.

The body 3 and the plate 4 are usually of comparatively light sheet metal and in order to give rigidity to the cover, the offset part of the plate is formed with one or more transverse corrugations 8, the apex of which preferably bears against the inner face of the body 3, and may if desired be secured thereto as by spot-welding. As here illustrated the intermediate part of the plate 4 is formed with a single transverse corrugation.

The self-contained means for securing the cover to the box is practically the same in general, in so far, as this invention is concerned, as that of our Patent No. 1,525,689, and comprises a wedge or nut 9 movable laterally while being clamped toward the cover, into snug engagement with the inner face of one wall of the box, such lateral movement tending to thrust the cover laterally in the opposite direction, and thrust one or more shoulders 10 on the opposite edge of the plate 4 to that on which the nut or wedge 9 is located into engagement with the opposite wall of the box, the wedge being operable by a screw 11 extending through the body 3 of the cover and threading into the nut. The nut and the plate are provided with coacting surfaces which tend to thrust the nut laterally when the screw 11 is being tightened, and to permit the nut to move inwardly or release its grip on the box when the screw is loosened.

In our present invention the nut extends into a transverse notch or slot 12 formed in the intermediate part 7 of the plate 4, this slot being alined with the inner end of the corrugation forming the bottom or the inner end wall of the slot; and the end of the corrugation which forms the bottom of the notch is bevelled, inclined plane fashion as at 13, and coacts with a correspondingly bevelled face 14 on the inner side of the nut. The end portions of the plate are formed with lengthwise tapering corrugations 15, for receiving inwardly extending lugs 16 on the gasket 6 and holding the gasket from displacement. These lugs also serve to prevent the workman from fastening the cover unless it is placed squarely on the box. The corrugations 15, form no part of this invention.

Owing to the corrugation 8 and the relative arrangement of the nut or wedge 9 the cover is particularly light and at the same time strong and rigid and provision made in a particularly simple manner for the wedging action of the nut.

What we claim is:

A cover for conduit outlet boxes, comprising a body, a plate secured to the inner side of the body, and spaced-apart from the edge of the body leaving a marginal bearing face on the body, the intermediate part of the plate being offset from the inner face of the body, and formed with a transverse corrugation, the plate being formed with a slot therein opening through one edge thereof, the corrugation being alined with the slot, and one end of the corrugation forming the inner end wall of the slot, and fastening means for attaching a cover to a conduit outlet box, comprising a wedge member extending into the slot, the wedge member and the end of the corrugation being formed with co-acting surfaces acting to thrust the wedge member laterally upon clamping movement of the wedge member toward the inner face of the cover, and means for clamping the wedge member.

In testimony whereof, we have hereunto signed our names, at Syracuse, in the county of Onondaga and State of New York, this 6th day of April, 1925.

JOHN T. PEARSON.
RAYMOND H. OLLEY.